US008754565B2

(12) United States Patent
Feroleto et al.

(10) Patent No.: US 8,754,565 B2
(45) Date of Patent: Jun. 17, 2014

(54) STATOR OF AN ELECTRIC MOTOR AND PROCESS FOR PRODUCING IT

(75) Inventors: Mauro Feroleto, Asti (IT); Michele Marino, Turin (IT)

(73) Assignee: Embraco Europe S.r.l., Turin (IT)

( * ) Notice: Subject to any disclaimer, the term of this patent is extended or adjusted under 35 U.S.C. 154(b) by 0 days.

(21) Appl. No.: 13/981,029

(22) PCT Filed: Feb. 17, 2012

(86) PCT No.: PCT/IB2012/050731
§ 371 (c)(1),
(2), (4) Date: Jul. 22, 2013

(87) PCT Pub. No.: WO2012/110985
PCT Pub. Date: Aug. 23, 2012

(65) Prior Publication Data
US 2013/0300240 A1    Nov. 14, 2013

(30) Foreign Application Priority Data

Feb. 18, 2011  (IT) .............................. TO2011A0142

(51) Int. Cl.
*H02K 1/16*    (2006.01)
(52) U.S. Cl.
USPC .............................. 310/216.114; 310/216.129
(58) Field of Classification Search
USPC .................... 310/216.004, 216.043, 216.044,
310/216.053, 216.056–216.058, 216.083,
310/216.084, 216.087, 216.113, 216.114,
310/216.129, 216.131
IPC ....................................................... H02K 1/16
See application file for complete search history.

(56) References Cited

U.S. PATENT DOCUMENTS

| 441,246 | A | * | 11/1890 | Lieb ............................... 310/265 |
| 1,267,993 | A | * | 5/1918 | Eaton ..................... 310/216.058 |
| 3,821,846 | A | | 7/1974 | Pleiss, Jr. |
| 4,361,953 | A | * | 12/1982 | Peachee .......................... 29/596 |
| 4,626,725 | A | * | 12/1986 | Kawada et al. .................. 310/89 |
| 7,866,030 | B2 | | 1/2011 | Grott et al. |
| 2003/0030535 | A1 | | 2/2003 | Sirois et al. |

FOREIGN PATENT DOCUMENTS

| DE | 44 23 840 A1 | 1/1996 |
| JP | 2004-23848 A | 1/2004 |
| JP | 2006-217770 A | 8/2006 |

* cited by examiner

*Primary Examiner* — Dang Le
(74) *Attorney, Agent, or Firm* — Sughrue Mion, PLLC

(57) ABSTRACT

The stator is formed by a pack (10) of stacked magnetic laminations (12), each of which has a central opening (14) and a plurality of peripheral holes (18), in such a way that the overlapping of identically shaped holes (18) in the laminations (12) defines respective passages through the pack (10). The faces of the laminations (12) are substantially flat and retaining means are associated with the holes (18) in an end lamination (12a) of the pack (10), these means protruding into the openings of the respective holes (18) in the end lamination (12a) without interfering with the other laminations (12) of the pack (10).
The corresponding production process provides for: inserting a pin (22) into each of the passages through the pack (10) at the end of which the retaining means are located, these means retaining the pin (22) and keeping the pack (10) close-packed; subjecting the close-packed pack (10) to heat treatment; releasing the pins (22) from the grip of the retaining means; and extracting them from the corresponding passages.

13 Claims, 4 Drawing Sheets

STATOR OF AN ELECTRIC MOTOR AND PROCESS FOR PRODUCING IT

CROSS REFERENCE TO RELATED APPLICATIONS

Figure 1:
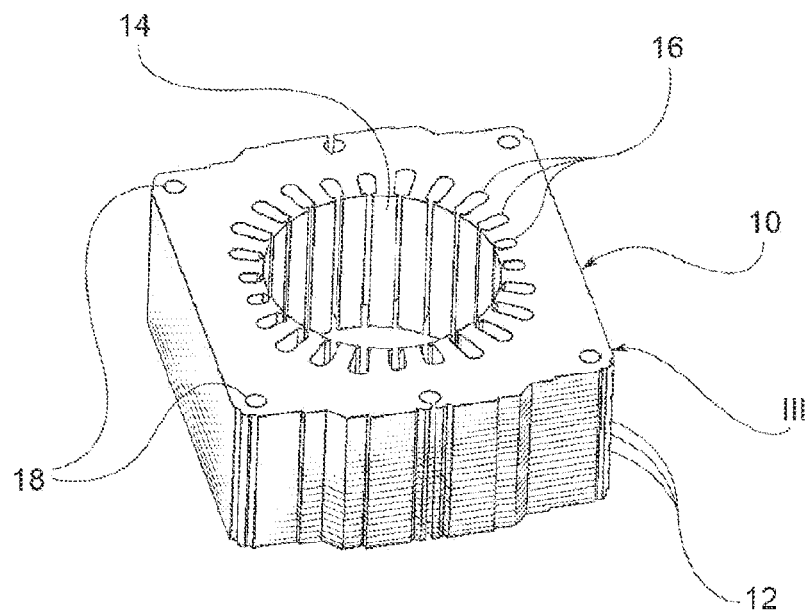

This application is a National Stage of International Application No. PCT/IB2012/050731, filed on Feb. 17, 2012, which claims priority from Italian Patent Application No. TO2011A000142, filed on Feb. 18, 2011, the contents of all of which are incorporated herein by reference in their entirety.

The present invention relates to a stator of an electric motor, in particular a rotary electric motor for hermetic compressors of refrigerators and the like.

As is known, a stator is formed by a pack of stacked magnetic laminations, each of which has a central opening and a plurality of peripheral holes, in such a way that the overlapping of identically shaped holes in the laminations defines respective passages through the pack. A screw is typically inserted into each of these passages in order to fix the stator to a support of the motor and thus keep the pack close-packed during operation.

This close packing must be ensured even during the stages of the processing of the stator pack, which take place before its assembly with the other components of the motor.

Consequently, in the prior art, the magnetic laminations are not made completely flat, but have a three-dimensional profile with projections and recesses, in such a way that their stacking causes the projections of one lamination to be inserted into the recesses of the adjacent laminations, thus ensuring that the pack remains close-packed.

The magnetic laminations are also typically coated on one face with a film which insulates them electrically from each other once they are stacked. The operation of three-dimensional shaping therefore has the undesired effect of interrupting the continuity of the insulating film, in such a way that short circuits are established in the stator pack, and may reduce the efficiency of the motor when in use.

The object of the present invention is therefore to overcome this drawback of the known art.

According to the invention, this object is achieved by means of a stator of the type mentioned at the start of the present description, characterized in that the faces of the laminations are substantially flat, and in that retaining means are associated with at least one hole of an end lamination of the pack, these means protruding into the opening of the hole in the end lamination without interfering with the other laminations of the pack.

These retaining means are preferably formed by tabs integral with the end lamination, which protrude from the circular perimeter of each respective hole or form the shape of a polygon. The tabs, which retain a fastener such as a pin inserted into each passage through the stator pack, enable the pack to be kept close-packed during the various stages of processing, without alterations in its structure which would be harmful in respect of its electrical properties.

A further object of the present invention is therefore a process for producing a stator of the aforementioned type, this process comprising the successive steps of:

inserting a respective pin into the at least one passage through the pack of stacked magnetic laminations at the end of which the retaining means are located, in such a way that the pin is retained in the passage and keeps the pack close-packed, subjecting the close-packed pack to heat treatment, and releasing the pin from the grip of the retaining means and extracting it from the respective passage, which thus remains free.

If necessary, the retaining means can also be removed after they have performed their function.

This production process is particularly advantageous because it enables the whole stator pack to be heat treated in one piece, after which it is possible to apply the insulation layer of the central aperture, which, being typically made of polymer material, would be incapable of withstanding the temperatures of several hundred degrees required for the heat treatment.

Figure 2:
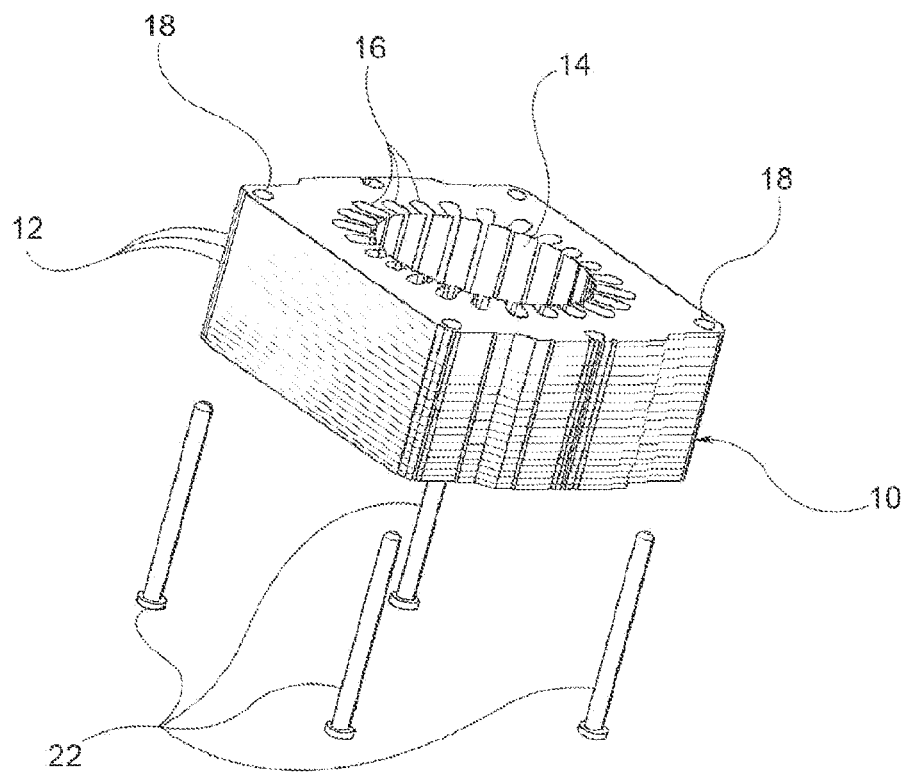
Figure 3:
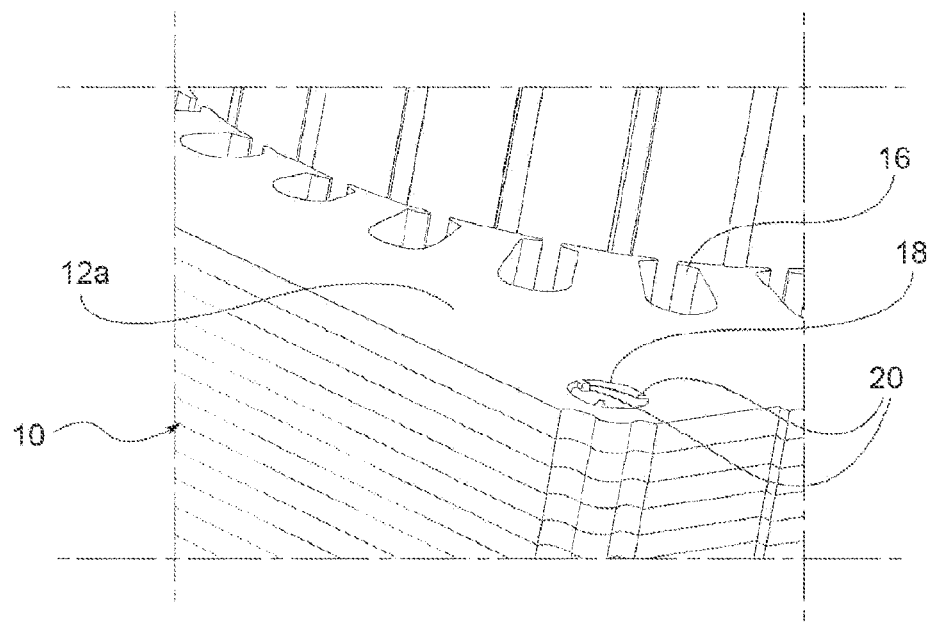
Figure 4:
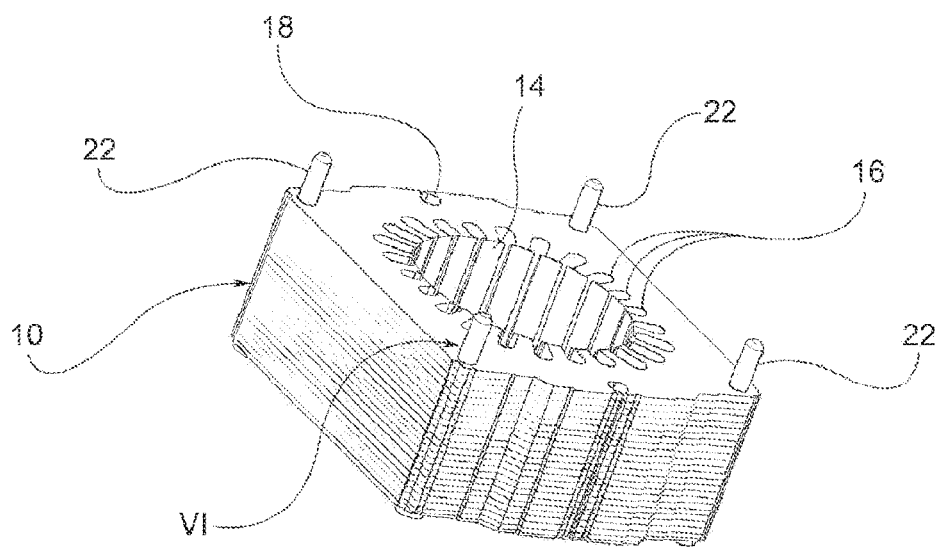
Figure 5:
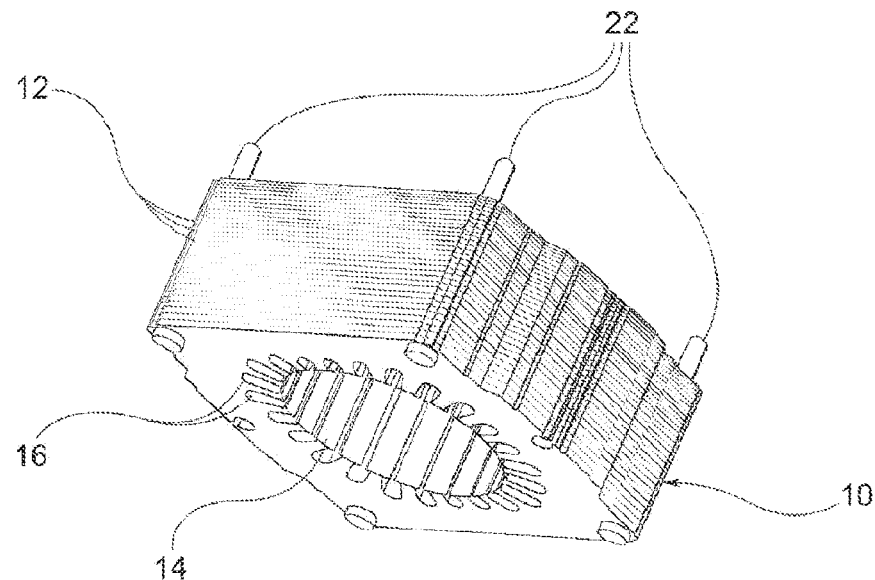
Figure 6:
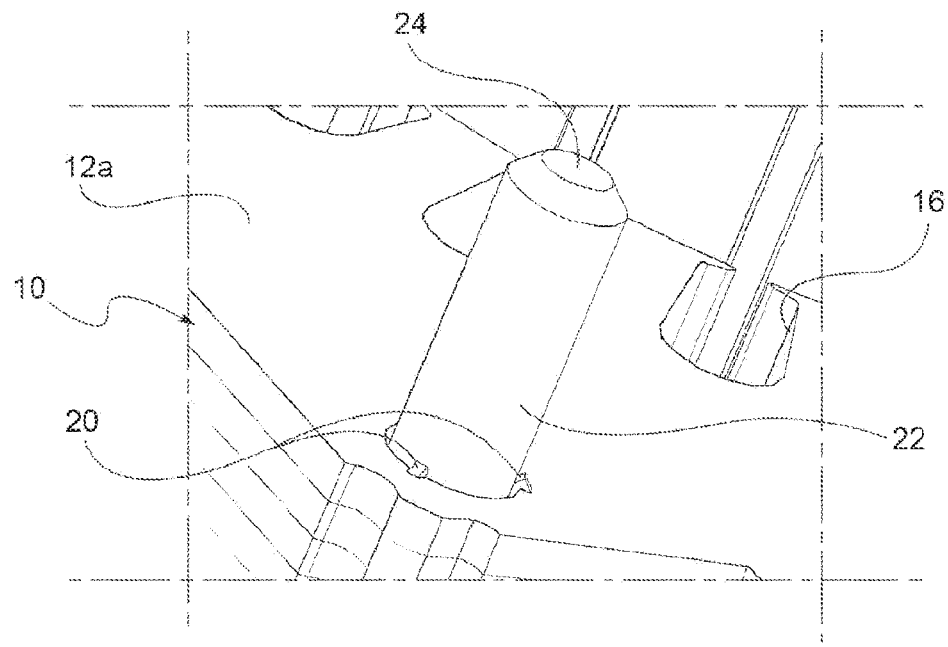
Figure 7:
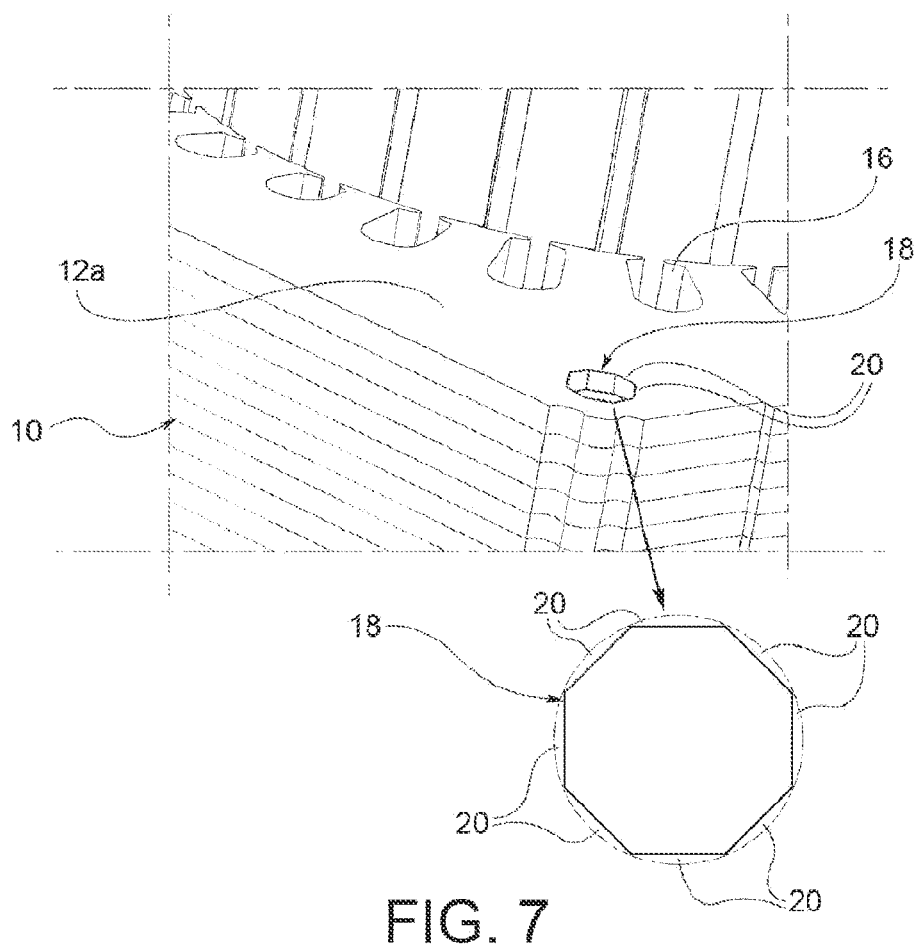
Figure 8:
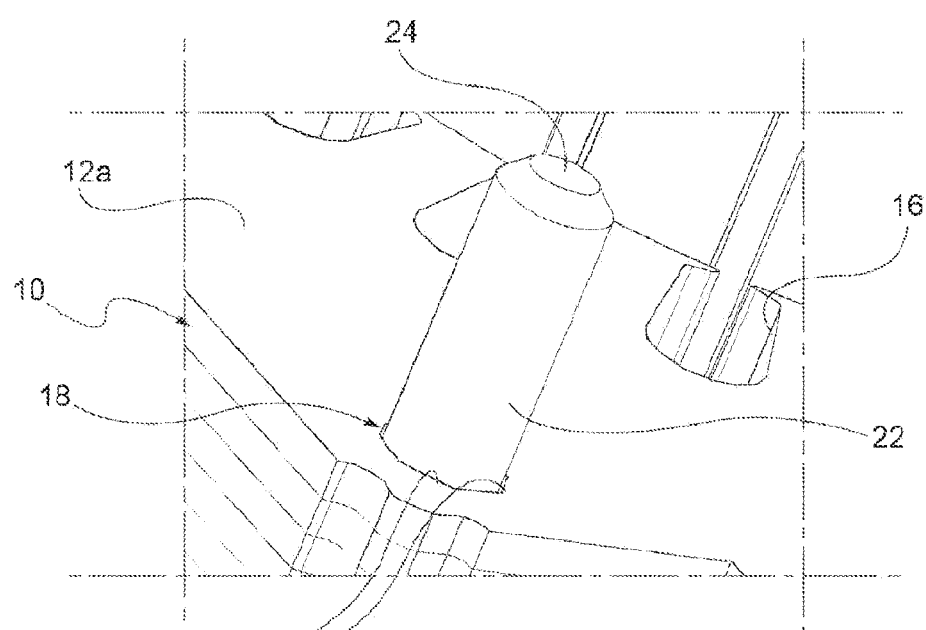

Other advantages and characteristics of the present invention will become clear from the following detailed description which is given by way of non-limiting example with reference to the attached drawings, in which:

FIGS. 1 and 2 are perspective views of a pack of laminations during the first steps of a process for producing a stator according to the invention, FIG. 3 is an enlarged perspective view of a detail of FIGS. 1 and 2, FIGS. 4 and 5 are perspective views from two different viewpoints of a subsequent step of the process for producing a stator according to the invention, FIG. 6 is an enlarged perspective view of a detail of FIG. 4, and FIGS. 7 and 8 are perspective views, corresponding to FIGS. 3 and 6 respectively, showing a further embodiment of the invention.

A stator of an electric motor, particularly a rotary electric motor for hermetic compressors of refrigerators and the like, is formed (FIG. 1) by a pack 10 of stacked magnetic laminations 12, the faces of which are substantially flat. One face of each lamination 12 is coated in a conventional way with an insulating film.

Each lamination 12 also has a central aperture 14 from the edges of which a plurality of cavities 16 extend, and a plurality of peripheral holes 18, in such a way that the overlapping of identically shaped holes 18 in the laminations 12 defines respective passages through the pack 10, while the overlapping of the apertures 14 defines a large central through void with the associated through cavities 16.

Each lamination 12, and consequently the corresponding pack 10, has a substantially quadrilateral shape. Retaining means are associated (FIG. 3) with the four holes 18 which are located close to the respective corners of an end lamination 12a of the pack 10, these means protruding into the openings of the respective holes 18. These means are formed, in particular, by a plurality of tabs 20 protruding radially towards the centre of each hole 18 from the perimeter of the hole, which is circular.

The tabs 20 are integral with the end lamination 12a and lie in its plane without interfering with the other laminations 12 of the pack 10. In other embodiments not shown in the drawings, it would be possible for the tabs to protrude from a corresponding circular crown fixed on the lamination around each hole 18 and thus lie in a plane parallel to that of the lamination, still without interfering with the other laminations 12 of the pack 10.

A process for producing the stator described above provides for the insertion of a fastener or pin 22 (FIG. 2) into each of the four corner passages (defined by the overlapping holes 18) formed through the pack 10 of stacked laminations 12 at the end of which the tabs 20 are located. The engagement (FIGS. 4-6) created between the tabs and the ends of the pins 22 is such that the pins are retained in the respective passages and keep the pack 10 close-packed.

The pack can thus be subjected to heat treatment. The pins 22 are then released from the grip of the tabs 20 by pushing the respective ends 24 (FIG. 6) protruding from the pack 10, in such a way that the pins 22 can be extracted from the respective passages, which remain free.

The central aperture 14 of the laminations 12 can then be coated with insulating material to form a continuous coating, and the windings can be inserted into the cavities 16 which extend from this aperture 14. These operations are carried out in an entirely conventional way, and are therefore not illustrated or described in detail herein.

The resulting stator can finally be fixed—again in a known way, which is not illustrated in the drawings—to a support of the corresponding motor, by means of respective screws which are passed through the passages in the pack 10 and are screwed into female threads formed therein. To facilitate this operation, the diameter of the screws is smaller than that of the pins 22, thus ensuring that the screws do not interfere with the tabs 20. Alternatively, the tabs 20 could be removed after they have performed their function of retaining the pins 22, so that any obstacle to the fastening screws is removed in advance.

The motor produced in this way is more efficient, because the coating originally applied to one face of each lamination 12 has remained unharmed throughout the stages of processing, thus ensuring perfect insulation and preventing the occurrence of parasitic currents.

A second embodiment of the present invention is shown in FIGS. 7 and 8, which correspond to the previously described FIGS. 3 and 6 respectively, and in which identical or equivalent parts are indicated by numbers identical to those used previously.

The only difference from the preceding embodiment is that the tabs 20, again formed integrally with the end lamination 12a and lying in the plane of the latter without interfering with the other laminations 12, form the shape of a regular octagon (FIG. 7) which defines the opening of each hole 18 in the end lamination 12a. Clearly, the tabs 20 could form the shape of a different regular or irregular polygon, for example a polygon with 5 to 12 sides. The process for producing the stator—which is analogous to that described previously—provides for the insertion of a respective pin 22 of circular section (FIG. 8) into each of the four corner passages formed through the pack 10 of stacked laminations 12, at the end of which the tabs 20 are located. The engagement created between the polygonal shape of the holes 18 in the end lamination 12a and the circular section of the pins 22 causes the pins to be retained in the respective passages and keeps the pack 10 close-packed during the heat treatment.

Clearly, provided that the principle of the invention is retained, the details of construction and the forms of embodiment can be varied widely from what has been described purely by way of example, without departure from the scope of the invention.

The invention claimed is:

1. Stator of an electric motor, in particular a rotary electric motor for hermetic compressors of refrigerators and the like, which stator is formed by a pack (10) of stacked magnetic laminations (12), each lamination (12) having a central aperture (14) and a plurality of peripheral holes (18), whereby the overlapping of identically shaped holes (18) in the laminations (12) defines respective passages through the pack (10), wherein the faces of the laminations (12) are substantially flat and retaining means are associated with at least one hole (18) of an end lamination (12a) of the pack (10), these means protruding into the opening of the hole (18) in the end lamination (12a) without interfering with the other laminations (12) of the pack (10).

2. Stator according to claim 1, wherein the retaining means comprise a plurality of tabs (20) protruding radially towards the centre of the respective hole (18).

3. Stator according to claim 2, wherein the tabs (20) are integral with the end lamination (12a).

4. Stator according to claim 2, wherein the tabs protrude from a crown fixed on the end lamination (12a) around the respective hole (18).

5. Stator according to claim 2, wherein the tabs (20) protrude from the circular perimeter of the respective hole (18).

6. Stator according to claim 1, wherein each lamination (12) has a substantially quadrilateral external shape and the retaining means are associated with four holes (18), each located close to a respective corner of the end lamination (12a).

7. Stator according to claim 1, wherein the retaining means comprise a plurality of tabs (20) which form the shape of a polygon, in particular a polygon having from 5 to 12 sides, preferably a regular octagon.

8. Stator according to claim 1, wherein a face of each lamination (12) is coated with an insulating film.

9. Process for producing a stator formed by a pack (10) of stacked magnetic laminations (12), each lamination (12) having a central opening (14) and a plurality of peripheral holes (18), whereby the overlapping of identically shaped holes (18) in the laminations (12) defines respective passages through the pack (10), retaining means being associated with at least one hole (18) of an end lamination (12a) of the pack (10), these means protruding into the opening of the hole (18), and being formed by tabs (20) which are integral with the end lamination (12a) or protrude from a respective crown fixed to the lamination (12a) around the respective hole (18), the process comprising the successive steps of:
  inserting one pin (22) into the at least one passage through the pack (10) of stacked magnetic laminations (12) at the end of which the retaining means are located, in such a way that the pin (22) is retained in the passage and keeps the pack (10) close-packed,
  subjecting the close-packed pack (10) to heat treatment, and
  releasing the pin (22) from the grip of the retaining means and extracting it from the respective passage, which thus remains free.

10. Process according to claim 9, wherein the tabs (20) protrude into the opening of the hole (18) in the end lamination (12a) without interfering with the other laminations (12) of the pack (10).

11. Process according to claim 9, wherein the tabs (20) form the shape of a polygon, in particular a polygon having from 5 to 12 sides, preferably a regular octagon.

12. Process according to claim 9, comprising the further successive steps of:
  coating cavities (16) extending from the central opening (14) of the laminations (12) with insulating material, forming a continuous coating, and
  inserting respective windings into the cavities (16).

13. Process for producing an electric motor, according to which the stator produced by the process of claim 12 is fixed to a support by means of corresponding screws passing through the passages of the stator pack (10).

* * * * *